United States Patent [19]

Kurumisawa et al.

[11] Patent Number: 6,048,111
[45] Date of Patent: Apr. 11, 2000

[54] LIGHT-SENSITIVE MATERIAL PROCESSING APPARATUS

[75] Inventors: Junichi Kurumisawa, Saitama; Naoyuki Morita, Kanagawa, both of Japan

[73] Assignees: Fuji Photo Film Co., Ltd., Kanagawa; Fuji Photo Optical Co., Ltd., Saitama, both of Japan

[21] Appl. No.: 09/213,890

[22] Filed: Dec. 17, 1998

[30] Foreign Application Priority Data

Dec. 17, 1997 [JP] Japan .................................. 9-347861

[51] Int. Cl.[7] ...................................................... G03D 3/08
[52] U.S. Cl. .......................... 396/622; 396/617; 396/636; 355/27
[58] Field of Search ..................... 396/612, 613, 396/617, 620, 622, 624, 630, 638; 355/27, 28

[56] References Cited

U.S. PATENT DOCUMENTS 5,778,272 7/1998 Rosenburgh et al. ................... 396/564
5,822,644 10/1998 Gates et al. ............................. 396/630

*Primary Examiner*—Alan A. Mathews
*Attorney, Agent, or Firm*—Sughrue, Mion, Zinn, Macpeak & Seas, PLLC.

[57] ABSTRACT

There is provided a light-sensitive material processing apparatus comprising a development section having processing baths including a development bath, a fixing bath and washing baths, a drying section and a sorter section, wherein at least one of the processing baths is a pan-shaped horizontal processing bath with its upper surface opened that is disposed at a horizontal position, transports light-sensitive materials in processing solutions in the processing baths in a horizontal direction and can be drawn out in a horizontal direction which is parallel with or normal to the transport direction of the light-sensitive materials. The processing baths can be handled at ease and a space occupied by the apparatus can be reduced. Maintenance such as the cleaning, repair, replacement of the respective processing baths and the transport mechanism racks becomes also unnecessary. As a result, prints of high quality can be finished at all times.

5 Claims, 4 Drawing Sheets

LIGHT-SENSITIVE MATERIAL PROCESSING APPARATUS

BACKGROUND OF THE INVENTION

1. Field of the Invention

The present invention relates to the technical field of a light-sensitive material processing apparatus for subjecting light-sensitive materials such as photographic papers, photographic films and the like to wet development processing, and more specifically, to the technical field of a light-sensitive material processing apparatus for transporting exposed light-sensitive materials and automatically subjecting them to wet development processing such as color development, bleach-fixing, washing and the like.

2. Description of the Related Art

Photographs are finished as finished films by subjecting images recorded on photographic films (hereinafter, referred to simply as "film") such negative films, reversal films, X-ray films and the like to wet development processing such as color development, bleach-fixing, washing and the like. When the finished films are the reversal films or X-ray films, the images can be directly observed. When, however, the finished films are the negative films, they are completed as finished prints (photo-prints) in such a manner that the images recorded on the negative films are exposed and printed on light-sensitive materials such as photographic papers and the like and then developed.

As described above, since the light-sensitive materials such as the films and photographic papers must be subjected to the wet development processing to make the images recorded thereon to visible images, they are ordinarily processed by a light-sensitive material processing apparatus which automatically carries out wet development processing.

Heretofore, images recorded on films have been printed onto light-sensitive materials such as photographic papers and the like by means of direct (analog) exposure, in which projected light from the film is allowed to be incident on the light-sensitive material to achieve its areal exposure. Whereas, at present, there has become commercially practical digital photoprinters which are arranged such that image information recorded on, for example, films is photoelectrically read and converted into a digital signal and made to recording image data after it is subjected to various types of image processing and light-sensitive materials are scan exposed by recording light modulated in accordance with the image data so that images (latent images) are recorded on the light-sensitive materials and the light-sensitive materials are developed and output as finished prints.

The digital photoprinter is composed essentially of an input machine having an image reading device (scanner) for reading image data recorded on a film and a data processing device for subjecting image data read by the image reading device to various types of image processing (data processing) and the like; an output machine having an image recording apparatus (printer) comprising an image exposing device for digitally exposing a light-sensitive material in accordance with the image data having been subjected to the image processing and the like, a light-sensitive material supply unit for supplying the light-sensitive material to be exposed and a light-sensitive material transport mechanism for transporting the light-sensitive material supplied from the light-sensitive material supply unit through a preset transport passage including the image exposing device, and a light-sensitive material processing apparatus (processor) for developing the exposed light-sensitive material; and a controller for controlling and managing the digital photoprinter as a whole.

In the input machine, first, reading light emitted from a light source is incident on a film in the image reading device and projecting light which carries an image recorded on a film forms a focused image on an image sensor such as a CCD sensor or the like through an imaging lens. The focused image is read by being photoelectrically converted by the image sensor and supplied to the image (data) processing device as input image data which corresponds to the image recorded on the film.

Subsequently, the image (data) processing device subjects the image data which was input from the image reading device and digitized or image data which was previously digitized and input to various types of data processing in accordance with preset image processing conditions or various image processing conditions which are changed in correspondence to the image data as well as determines exposure conditions proper to the image data and transports the image data to the image exposing device of the output device as output image data.

The output machine is arranged such that when the image recording apparatus scan exposes an image with a light beam, in the image exposing the light beam is modulated in accordance with the image data transferred from the data processing device, the light beam is deflected in a main scanning direction and at the same time a light-sensitive material is transported in an auxiliary scanning direction substantially normal to the main scanning direction by the light-sensitive material transport mechanism to thereby two-dimensionally scan expose the light-sensitive material and record a latent image on the light-sensitive material. Thereafter, the light-sensitive material is subjected to development processing in accordance with the material in the light-sensitive material processing apparatus and arranged as a finished print on which the image recorded on the film is reproduced.

In the image recording apparatus making use of the digital exposure, since gradation correction and color/density correction is carried out by image processing in the image processing device as well as the exposure conditions are determined thereby, one image can be exposed in a short time and the exposure time is fixed in accordance with an image size, exposure can be promptly carried out in comparison with conventional direct exposure. Further, the image processing device permits editing of a printed image such as combination of a plurality of images and division of a single image into segments and image processing such as color/density adjustments and contour emphasis (sharpness processing) and the like to be optionally carried out so that a finished print which has been optionally edited and subjected to image processing can be output in accordance with application or use.

Further, since the image information of the finished print can be stored in a recording medium such as a magnetic optical disc, when the image information is stored in the recording medium, it is not necessary, for example, to read a film again and set exposure conditions again in a job for preparing extra prints or reprints, whereby the job can be very promptly and easily carried out. In addition, the image recording apparatus making use of the digital exposure is advantageous in that a print on which recorded image information is approximately completely reproduced can be output in such aspects as resolution, color/density reproduction and the like, which is difficult in a print made by conventional direct exposure.

As shown in FIG. 5, since the above digital photoprinter, an ordinary photoprinter employing direct exposure, and the like are also arranged such that a light-sensitive materials A, which has been exposed by digital exposure or analog exposure in an image recording apparatus 202 and to which latent images have been formed, is supplied to a light-sensitive material processing apparatus 204 and sequentially passes through wet processing bathes such as a development bath 206, fixing bath 208, washing baths 210a, 210b, 210c, 210d and the like, each of which is long in a vertical direction, located in the development section 212 of the light-sensitive material processing apparatus 204, is sequentially subjected to color development processing, bleach-fix processing, washing processing and the like, made to finished prints by being dried in a drying mechanisms disposed therein and sequentially dipped into processing solutions such as a developing solution, fixing solution, washing solutions and the like. In these processes, the light-sensitive material is turned upward at a position near to the lowermost end of a bath and lifted up to the upper end thereof and then transported to the next bath. Accordingly, when it is necessary to remove the vertically long transport mechanism racks from the respective processing baths in order to clean, repair and replace the transport mechanisms of the respective processing baths, clean the interior of the respective processing baths and execute maintenance to solve such troubles as the jamming of the light-sensitive material, there arises a problem that the vertically long transport mechanism racks must be lifted or drawn out upward along the vertically long processing baths by a very troublesome and time-consuming job.

Further, since the color developing solution in the development bath is an alkali aqueous solution and the fixing/bleaching solution in the fixing bath is an acid water solution, it is not preferable that an ordinary user executes the maintenance of these baths in a state that he is in direct contact with the solutions and it is not desired that the solutions contact clothes and skin. Therefore, there are problems that maintenance cannot be carried out by a person other than an expert service man and that each time a trouble arises or maintenance is required, it is necessary to call the expert service man because the ordinary user cannot deal with it.

SUMMARY OF THE INVENTION

A leading object of the present invention is to solve the above problems of prior art and provide a light-sensitive material processing apparatus which permits maintenance, which has heretofore required much expense in time and effort, for cleaning, repairing and replacing a plurality of processing baths such as a development bath, fixing bath washing baths and the like, transport mechanism racks disposed in the processing baths, and the like and solving a trouble such as the jamming of a light-sensitive material to be easily carried out by arranging the processing baths so as to be easily taken out horizontally and can stably finish the light-sensitive material to high quality prints at all times without the occurrence of a defectively colored or discolored print.

Another object of the present invention is to provide a light-sensitive material processing apparatus which can make maintenance itself unnecessary such as the cleaning, repair and replacement of a plurality of processing baths such as a development bath, fixing bath, washing bathes and the like, transport mechanism racks disposed in the respective processing oaths, and the like by arranging the respective processing baths as cartridges so that they can be easily replaced together with processing solutions, permits even an ordinary user to easily replace the respective processing baths containing deteriorated processing solutions without the need of calling an expert service man and can finish a light-sensitive material to high quality prints by preventing the occurrence of prints of bad quality such as a defectively colored print and a discolored print without continuously processing the light-sensitive material with the deteriorated processing solutions, in addition to the above object.

To achieve the above objects, the present invention provide a light-sensitive material processing apparatus comprising:

a development section having a plurality of processing baths including a development bath for subjecting exposed light-sensitive materials to color development processing, a fixing bath for subjecting the color developed light-sensitive materials to bleach-fix processing and washing baths for washing the bleached and fixed light-sensitive materials;

a drying section for drying the developed, fixed and washed light-sensitive material; and a sorter section for arranging and accumulating the dried light-sensitive materials;

wherein at least one of the processing baths including the development bath, the fixing bath and the washing baths which constitute the development section is a pan-shaped horizontal processing bath with its upper surface opened that is disposed at a horizontal position, transports the light-sensitive materials in the processing solutions in the processing baths in a horizontal direction and can be drawn out in a horizontal direction which is parallel with or normal to the transport direction of the light-sensitive materials.

It is preferable that the horizontal processing bath includes a transport mechanism for transporting the light-sensitive materials in the horizontal direction and the transport mechanism can be drawn out together with the horizontal processing bath and taken out upward from the upper side of said horizontal processing bath opened therefrom.

It is preferably that a plurality of said horizontal processing baths is disposed in a staggered arrangement by being stacked on top of each other so that the ends thereof alternately project in a light-sensitive material transport direction.

It is preferable that the horizontal processing bath has a lid member removably disposed on the open upper surface thereof to prevent the leakage of the processing solution Further, it is preferably that at least one of the development bath and the fixing bath of the horizontal processing baths is a horizontal processing bath cartridge including a transport mechanism for horizontally transporting the light-sensitive material and a processing solution each contained in the horizontal processing bath, a lid member disposed on the upper surface of said horizontal processing bath for sealing said horizontal processing bath in a liquid tight state except a light-sensitive material inlet port and a light-sensitive material outlet port which are disposed in the vicinities of both the sides of the horizontal processing bath in the light-sensitive material transport direction and liquid tight opening/closing lids which are opened only when they are loaded at preset positions of the light-sensitive material processing apparatus or the light-sensitive material is transported in or transported out.

DETAILED DESCRIPTION OF THE INVENTION

The present invention will be described in detail based on preferred embodiments of a light-sensitive material processing apparatus shown in the accompanying drawings.

While the light-sensitive material processing apparatus according to the present invention is similarly applicable to the wet developing processing of photographic films and the wet developing processing of photographic papers in a photographic technology, the following description will take up the photographic paper as a representative example of a light-sensitive material and describes a light-sensitive material processing apparatus applied to a digital photoprinter for photoelectrically reading an image carried by a photographic film or the like, exposing a photographic paper based on a read digital image signal and developing the photographic paper to thereby make it to a finished print.

Figure 1:
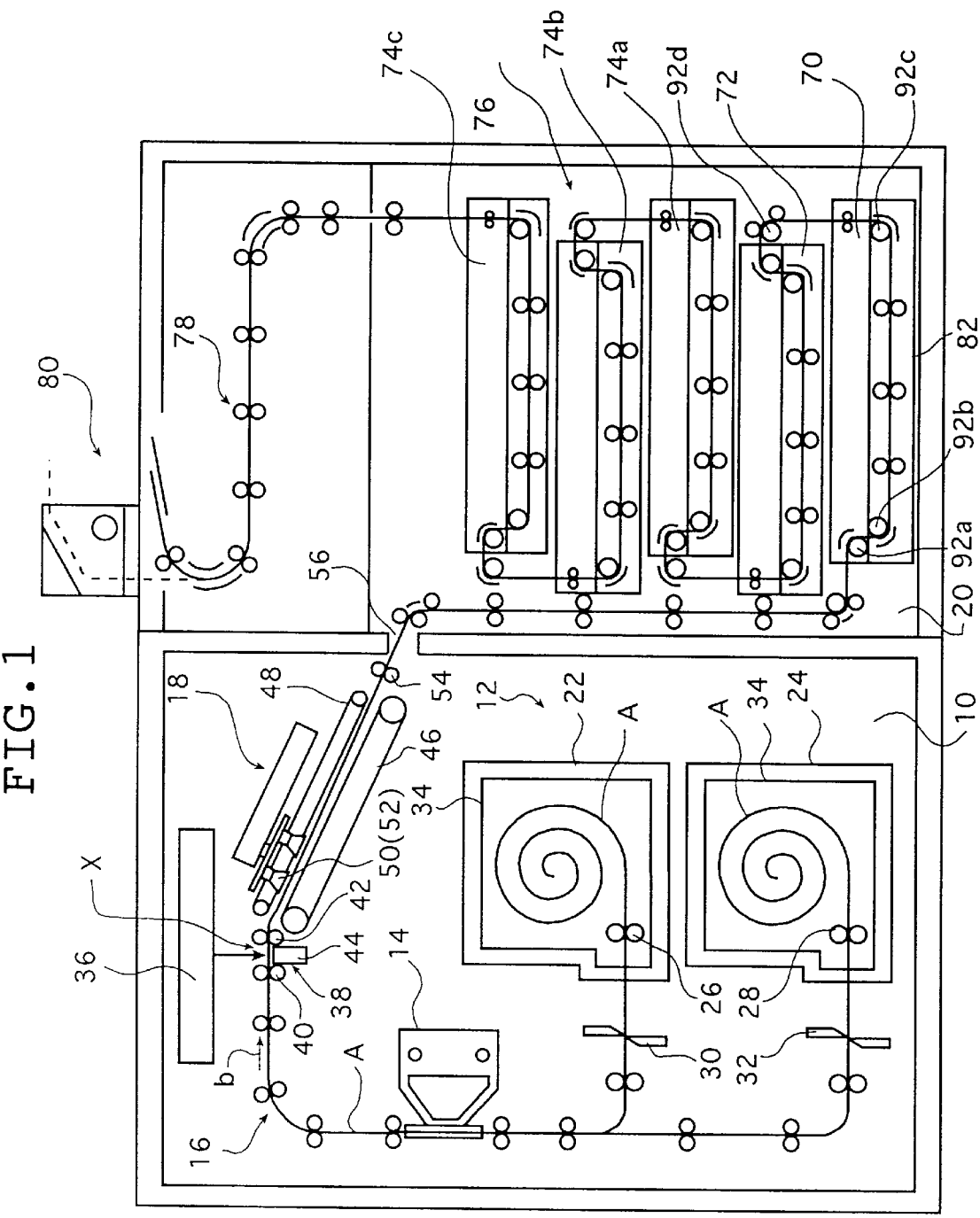
FIG. 1 is a schematic view of an embodiment in which a light-sensitive material processing apparatus of the present invention is applied to a digital photoprinter.

FIG. 1 is a schematic view of an embodiment in which the present invention is applied to the digital photoprinter. In FIG. 1, an image recording apparatus 10 cuts an elongated light-sensitive material A to cut sheets having a preset length corresponding to a finished print and thereafter executes back print (recording of back pint information) and digital exposure (print of a latent image) and supplies the exposed light-sensitive materials A to a light-sensitive material processing apparatus (processor) 20. In the illustrated example, the image recording apparatus 10 includes a light-sensitive material supply unit 12, a back print unit 14, an image recording unit (image exposing device) 16, a distribution unit 18 and the like.

The image recording apparatus 10 includes a plurality of transport roller pairs as a transport mechanism for transporting the light-sensitive materials A from the light-sensitive material supply unit 12 to the image recording unit 16 and further transporting the light-sensitive materials A having been subjected to exposure to the light-sensitive material processing apparatus 20. The image recording apparatus 10 is provided with various types of components such as, for example, the transport mechanism of the light-sensitive materials A, various types of sensors and the like as necessary. The transport mechanism of the light-sensitive materials A is not particularly limited and any known sheet transport methods such as a belt conveyer, nip belt, transport lift making use of sucking, etc. may be employed in addition to the transport roller pairs.

In the image recording apparatus 10, the light-sensitive material supply unit 12 includes loading sections 22, 24 for loading the light-sensitive material A, magazines 34, cutters 30, 32, and the like.

The loading sections 22, 24 are sections where the magazines 34 in which the light-sensitive material A is accommodated are loaded. Loaded on both the loading sections 22, 24 are the magazines 34 in which a different type of light-sensitive materials A which are different in a size (width), surface type (silk, matt, etc.) specifications (thickness, type of a base, etc.) and the like are accommodated.

Each of the magazine 34 is a light-proof case accommodating a web of the light-sensitive material A, which is wound to a roll shape with a recording surface (emulsion surface) facing outside. In the illustrated example, drawing-out roller pairs 26 and 28 are disposed in the magazines 34 and the loading of the magazines 34 at the preset positions of the loading sections 22 and 24 permits the drawing-out roller pairs 26, 28 to be engaged with drive sources (not shown) disposed to the loading sections 22, 24, respectively.

The cutter 30, 32 cut the web of the light-sensitive materials A accommodated in the magazines 34 to the preset length in accordance with the finished print size.

In the light-sensitive material supply unit 12, the light-sensitive materials A are drawn out from the magazines 34 by the drawing-out roller pairs 26 and 28 and transported by the transport mechanism to the back print unit 14 located downstream of the transport direction of the light-sensitive materials A (hereinafter, referred to as downstream). The transport of the light-sensitive materials A is stopped when the length thereof transported downstream reaches the length of the finished print and the light-sensitive materials A are cut by the cutters 30, 32 interposed between the magazines 34 and the back print unit 14 and made to the cut sheets.

In the illustrated example, the back print unit 14 is disposed downstream of the light-sensitive material supply unit 12. The back print unit 14 records various types of information, that is, a so-called back print (back print information) such as a photographed date, printed date, frame number, film ID number, ID number of a camera used in photographing, ID number of a digital photoprinter and the like on the back surface (non-emulsion surface) of the light-sensitive material A The back print is recorded on the light-sensitive material A by the back print unit 14.

The image recording unit 16 is disposed downstream of the back print unit 14.

The image recording unit 16 includes an exposure unit 36 for scan exposing the light-sensitive materials A in a main scanning direction (in a direction vertical to the plane of FIG. 1) in accordance with the output image data supplied from the input machine of the not shown digital photoprinter and a scanning transport means 38 for transporting the light-sensitive materials A at a preset speed in an auxiliary scanning direction substantially normal to the main scanning direction (in the direction of an arrow b in the figure).

The exposure unit 36 is an optical beam scanner composed of three light sources which emit optical beams for exposing the light-sensitive materials A with red (R), green (G) and blue (B) lights, a modulating means such as AOM (acoustic optical modulator) which modulates the light beams emitted from the light sources in accordance with image data, a light deflector such as a polygon mirror or the like which deflects the modulated light beams in the main scanning direction, an fθ (scanning) lens with which the light beams deflected in the main scanning direction are focused to from a beam spot of a preset diameter at a preset position in a recording position (scanning line) X, and the like.

The scanning transport means 38 is composed of a pair of transport roller pairs 40, 42 which are disposed forward and rearward across the exposing position X, an exposure guide 44 for holding the light-sensitive material A at the exposing position X with a pinpoint accuracy, and the like.

The scanning transport means 38 transports the sheet-shaped light-sensitive material A in the auxiliary scanning direction normal to the main scanning direction by the transport roller pairs 40, 42 while maintaining it at the exposing position X by the exposure guide 44. Since the light beams are deflected in the main scanning direction, the light-sensitive material A is two-dimensionally scan exposed by the light beams and a latent image is formed thereon.

In the image recording unit 16, the light-sensitive material A is transported in the auxiliary scanning direction approximately normal to the main scanning direction by the transport roller pairs 40, 42 of the scanning transport means 38 while recording light which is modulated in accordance with the digital image data is deflected in the main scanning direction by the exposure unit 36 and the light-sensitive material A is held at the exposing position X along the exposure guide 44 so that the light-sensitive material A is two-dimensionally scan exposed to record the latent image thereon, that is, an image is recorded on the light-sensitive material A by so-called raster scan exposure.

The distribution unit 18 is disposed at a position further downstream of the image recording unit 16.

In the processes for exposing and developing a silver salt photographic light-sensitive material which is used to ordinary photographs at present, the exposure process requires a longer time than the development process. Therefore, when a plurality of light-sensitive materials are continuously exposed and developed, a developing time becomes insufficient to an exposing time. That is, the speed of the exposure process and the development process is generally restricted by the development process.

The distribution unit 18 is disposed to solve the above problem by distributing the light-sensitive materials A which are ordinarily transported in a single row to a plurality of rows with respect to a transport direction to thereby supply a plurality of rows of the light-sensitive materials A to the light-sensitive material processing apparatus 20 in parallel with each other so as to increase the processing capability thereof so that the difference between the processing times in the exposure process and the development process can be compensated. In the illustrated example, the distribution unit 18 includes a belt conveyer 46, an auxiliary belt conveyer 48, two sucking units 50, 52 each having two suckers connected to a not shown sucking means, and the like.

The light-sensitive material A having been exposed is not transported by being nipped between the belt conveyer 46 and the auxiliary belt conveyer 48 but transported by being placed on the belt conveyer 46 downstream. The speed at which the light-sensitive material A is transported by the belt conveyer 46 and auxiliary belt conveyer 48 is set a little higher than the scan transport speed. With this arrangement, the effect of the driven belt conveyer 46 and auxiliary belt conveyer 48 on the scan transport of the light-sensitive material A can be reliably removed.

The auxiliary belt conveyer 48 is disposed on the center line of the belt conveyer 46 in the width direction thereof with an slight clearance to the belt conveyer 46. The auxiliary belt conveyer 48 depresses any curl of the light-sensitive material A and assists the light-sensitive material A which is transported by the belt conveyer 46 and sucked and held by the sucking units 50 and 52. The auxiliary belt conveyer 48 is composed of an endless belt having a narrow width so that the even light-sensitive material A having a minimum size in a width direction can be sucked and held by the sucking units 50, 52.

The sucking units 50 and 52 are disposed on both the sides of the auxiliary belt conveyer 48 in the width direction thereof, respectively. After the light-sensitive material A is released from the scanning transport means 38 and transported to a preset position by the belt conveyer 46, the sucking unit 50 located on the operator's side in the figure sucks and holds the light-sensitive material A and slightly lifts it, transfers it obliquely downstream to the right side (on the operator's side in the figure) with respect to the transport direction of the light-sensitive material A and distributes the light-sensitive material A to the right side by releasing it from the sucked state. Likewise, the sucking unit 52 located inward distributes the A to the left side.

The light-sensitive materials A can be distributed to three rows by sequentially repeating, for example, the distribution thereof in a right direction by the sucking unit 50, the distribution thereof in a left direction by the sucking unit 52 and the linear transport thereof without distribution. Otherwise, the light-sensitive materials A can be distributed to two rows by alternately distributing the light-sensitive materials A in the right direction and the left direction by the sucking units 50, 52. Further, the light-sensitive materials A can be also supplied to the light-sensitive material processing apparatus 20 in a single row by linearly transporting them without distributing them.

The light-sensitive materials A having been distributed in a lateral direction in the distribution unit 18 are disposed in a plurality of rows while being overlapped in the transport direction by a transport roller pair 54 and supplied to the light-sensitive material processing apparatus 20 through a discharge port 56.

In the illustrated embodiment, when, for example, the silver salt photographic light-sensitive materials are to be developed, the light-sensitive material processing apparatus 20 includes a development section 76, a drying section 78 for drying the light-sensitive material having been developed and fixed and making them to finished prints, a sorter section 80 for arranging the light-sensitive materials (finished prints) having been dried and finished again in a single row in the order when the prints were made (in the order of exposure), and the like. The development section 76 is composed of a development bath 70 for carrying out color development processing, a fixing bath 72 for carrying out bleach-fix processing and three washing baths 74a, 74b, 74c for carrying out washing.

Figure 2:
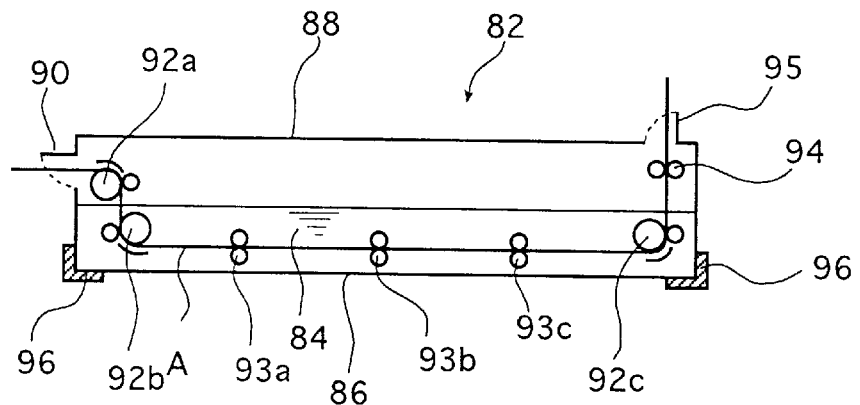
FIG. 2 is a detailed view showing a processing bath shown in FIG. 1 in detail.

FIG. 2 is a detailed view showing a processing bath applied to the development bath 70, fixing bath 72 and three washing baths 74a, 74b, 74c shown in FIG. 1 in detail in the present invention.

As shown in FIG. 2 in detail, the development bath 70, fixing bath 72 and three washing baths 74a, 74b, 74c shown in FIG. 1 are pan-shaped shallow horizontal processing baths 82 having a substantially similar arrangement. As shown in FIG. 1, a plurality of the processing baths 82 are disposed by being stacked on top of each other to a plurality of stages and constitute the development section 76 for sequentially executing the color development processing, bleaching-fix processing, wash processing and the like.

As shown in FIG. 2, the processing bath 82 of the embodiment is composed of a processing bath main body 86 in which a processing solution 84 is held and a lid member 88. In the embodiment, the light-sensitive material A is introduced into the processing bath 82 from a left side through a shutter 90 disposed to an upper side of a left side wall (surface) of the processing bath main body 86; dipped into the processing solution 84 by being guided downward by a guide rollers 92a, 92b and; horizontally transported in the processing solution 84 by transport roller pairs 93a, 93b, 93c so as to be subjected to the color development processing, the bleach-fix processing or washing depending upon the processing solution 84; guided upward by a guide roller 92c at the right end of the processing bath 82; taken out to the outside of the processing bath 82 through a shutter 95 disposed to a right side of an upper surface of the lid member 88 after the processing solution 84 in contact with the light-sensitive material A is squeezed by a squeeze roller pair 94 disposed below the lid member 88; and then guided leftward by guide rollers 90d disposed at an upper position and introduced to the next processing bath or transported to the drying section 78 when the above processing bath is a final processing bath.

The lid member 88 prevents the processing solution 84 from waving and overflowing when the processing bath 82 containing the processing solution 84 is moved and transported. It is preferable that the lid member 88 is fitted to the processing bath main body 86 so as to seal it water tight. Further, it is preferable to seal the shutter 90 disposed to side wall of the processing bath 82 and the shutter 95 disposed to the lid member 88 likewise unless the processing bath 82 is loaded to a preset loading position of the light-sensitive material processing apparatus 20 and unless the light-sensitive material A is caused to pass therethrough. Further, it is more preferable to dispose a wave preventing plate and the like in the processing bath main body 86 or a wave preventing device such as a sheet which floats on the upper surface of the processing solution 84 to prevent the processing solution 84 from greatly waving.

In the embodiment, the shutters 90 and 95 are opening/closing ports which are disposed to the upper side of the left side wall of the processing bath main body 86 and the right side of the upper surface of the lid member 88, respectively and opened and closed by being turned. The shutters 90 and 95 are arranged such that when the processing bath 82 is loaded to or locked at the preset position or when the light-sensitive material A is inserted into or discharged from the processing bath 82, they are opened by being turned inward. Whereas, when the processing bath 82 is released from the preset loading position where it is locked or removed from the loading position or when the light-sensitive material A has passed through the opening/closing ports, the shutters 90 and 95 are closed by springs to thereby seal the opening/closing ports. The squeeze roller pair 94 returns the processing solution 84 which is in contact with the light-sensitive material A into the processing bath 82. The squeeze roller pair 94 is arranged such that the light-sensitive material A is caused to pass between two elastic rollers composed of rubber or the like so that the processing solution 84 is squeezed and returned into the processing bath 82.

The shutters 90, 95 and the squeeze roller pair 94 are not limited to the above structures. That is, the shutters 90 and 95 may employ such arbitrary structures that they are opened while the processing bath 82 is loaded to or locked at the preset position and automatically sealed when it is removed from the preset position or that the light-sensitive material A can be inserted through the shutters 90 and 95 and after it passes therethrough, they can be automatically sealed. In addition, each of the shutters 90 and 95 may be disposed on the lid member 88 or the side wall of the processing bath main body 86 and an outside surface side thereof or an inside surface side thereof. For example, both of the shutters 90 and 95 may be disposed on the lid member 88 or the side wall (outside (surface) side) of the processing bath main body 86. Further, the squeeze roller pair 94 is not limited to a roller pair so long as it can return the processing solution 84 in contact with the light-sensitive material A into the processing bath 82. That is, it is needless to say that any arrangement such as a squeezer composed of two tongue-shaped elastic members formed of rubber or the like may be employed so long as it is a squeeze means.

The guide rollers 92a, 92b, 92c and 92d for transporting the light-sensitive material A in a desired transport direction internally and externally of the processing bath 82 may have a transport guide and a nip roller as shown in the illustrated example. The guide rollers 92a–92d may have any arrangement so long as they can change the transport direction of the light-sensitive material A to a desired direction and guide it in the desired direction and are not particularly limited to the arrangement shown in the illustrated example.

Further, the horizontal transport roller pairs 93a, 93b and 93c for transporting the light-sensitive material A horizontally in the processing solution 84 of the processing bath 82 are not particularly restricted and may employ any arbitrary arrangement so long as they are arranged to horizontally transport the light-sensitive material A in the processing solution 84.

The guide rollers 92a, 92b, 92c, optionally 92d, the horizontal transport roller pairs 93a, 93b, 93c and the squeeze roller pair 94 are arranged as an integral transport mechanism rack each having bearing units attached to two side plates (not shown) and accommodated in the processing bath main body 86 so that they rotate in a preset direction. Therefore, when the processing bath 82 is drawn out to the operator's side, the transport mechanism rack can be drawn out simultaneously with the processing bath 82.

At least one of the drive shafts of the guide rollers 92a, 92b, 92c, the horizontal transport roller pair 93a, 93b, 93c and the squeeze roller pair 94, for example, preferably at least one of the drive shafts of the guide roller 92a and the squeeze roller pair 94 projects through the processing bath main body 86 and is coupled with a not shown external drive source when the processing bath 82 is loaded and placed to the preset position so as to permit the light-sensitive material A to be transported in the processing bath 82.

The transport mechanism of the light-sensitive material A in the processing bath 82 is not of course limited to the guide rollers 92a, 92b, 92c, the horizontal transport roller pair 93a, 93b, 93c and the squeeze roller pair 94 and any proper and arbitrary transport mechanism and detection mechanism may be employed so as to stably transport the light-sensitive material A depending upon a shape of the light-sensitive material A and in particular depending upon whether it is the web of light-sensitive material or a sheet-shaped light-sensitive material. Likewise, the transport mechanism of the light-sensitive material A located externally of the processing bath 82 is not limited only to the guide roller 92d and any arbitrary transport mechanism and detection mechanism may be employed. It is apparent that the light-sensitive material A can be stably transported and caused to reliably pass through the shutter 90 and 95 by these transport mechanisms and the detection mechanisms.

Each of the processing baths 82 is placed on a guide frame 96 so that the right and left ends thereof can be moved in a forward/backward direction (a direction vertical to the plane of FIG. 2). Therefore, the processing bath 82 can be drawn out toward the operator's side (in a horizontal direction normal to the transport direction of the light-sensitive material A) at any time after the light-sensitive material A passes through the processing bath 82. When the transport mechanism rack in the processing bath 82 is cleaned, repaired or replaced or when the processing bath 82 itself is cleaned, repaired or replaced, the processing bath 82 is drawn out toward the operator's side; the lid member 88 is removed therefrom; the transport mechanism rack is taken out from the processing bath 82 and cleaned, repaired or replaced; thereafter the transport rack mechanism is accommodated in the processing bath 82 again, a new processing solution 84 is charged into the processing bath 82 when necessary; and the lid member 88 is tightly sealed thereto. Otherwise, the processing bath 82 itself is cleaned, repaired or replaced and placed to and loaded to the original position. With this operation, the maintenance such as cleaning, repair and replacement of the transport mechanism rack and the processing bath 82 itself can be easily carried out. The processing bath 82 may be taken out backward or sideward of the apparatus or in addition to the operator's side so long as it is taken out horizontally.

When the maintenance such as cleaning, repair, replacement and the like of the transport mechanism rack and the processing bath 82 itself takes a time, at least one of the developing bath 70, in which the developing solution as an alkali aqueous solution is stored, and the fixing bath 72, in which the fixing solution as an acid aqueous solution is stored, and the like is composed of the processing bath 82 which is constructed as an integrally arranged processing bath cartridge and disposing the cartridge to the position where an originally used processing bath was disposed in place of it; the processing bath 82 as the integrally arranged cartridge is constructed such that an integrally arranged transport mechanism rack which is composed of the guide rollers 92a–92c, the horizontally transporting rollers 93a–93c, the squeeze roller pair 94 and the like is accommodated in the processing bath main body 86 which is filled with a preset amount of the processing solution 84 and the processing bath main body 86 is tightly sealed with the lid member 88. With this arrangement, not only a time during which the photoprinter must be stopped for the maintenance of the transport mechanism rack and the processing bath 82 can be minimized but also the replenishment or replacement of the processing solution 84 is made unnecessary or can be executed very easily. As a result, even if the maintenance of the processing bath 82 is required, an ordinary user can easily replace the processing bath cartridge without the need of calling an expert service man.

Incidentally, when the processing baths 82 such as the development bath 70, the fixing bath 72, the washing baths 74a, 74b, 74c and the like are loaded to the preset positions of the light-sensitive material processing apparatus 20, the processing solutions 84 in the respective processing baths 82, for example, the developing solution, fixing solution and washing solutions must be replenished with a new developing solution, fixing solution and washing solutions as they are used. Further, the processing solutions 84 must be circulated in the respective processing baths as necessary to make the processing solutions 84 uniform. For this purpose, a processing solution replenishing device composed of processing solutions replenishing tanks, replenishing pumps, circulating pipes and the like for the respective processing solutions 84 and a processing solution circulating device composed of circulating pumps, circulating pipes and the like are disposed to the light-sensitive material processing apparatus 20, although not shown. When the processing baths 82 are loaded to the preset positions, the replenishing pipes and circulating pipes of these devices are coupled with opening/closing ports formed to the processing bath 82 liquid tight. Therefore, when maintenance is carried out to the processing baths 82, the new processing solutions 84 may be replenished any of before and after the processing bath 82 are loaded on the light-sensitive material processing apparatus 20. Note, when the processing bath 82 is arranged as the cartridge, it suffices only to replace it with a new processing bath 82 together with the processing solution 84 contained therein when the processing solution 84 is deteriorated, for example, when a preset number of sheets have been processed in the processing solution 84. Thus, the processing solution replenishing device and the processing solution circulating device need not be provided. When the developing solution, fixing solution and washing solutions (a stabilizing agent, an antiseptic, etc. to be added to the washing water) are replenished or replaced, condensed solutions are used. However, the present invention is not limited to the condensed solutions and processing agents formed to tablets may be used by being dissolved with water or the dissolved solutions may be used as condensed processing solutions for replenishing or replacing the solutions.

In the embodiment, the three washing baths 74a, 74b, 74c are used and a multi-stage countercurrent washing system is applied thereto. Since these three washing baths 74a, 74b, 74c repeat washing sequentially from the lowermost bath and the uppermost washing bath 74c carries out finish washing, the water in the uppermost washing bath 74c must be kept most clean. For this purpose, clean water is supplied to a final washing bath and sequentially overflown therefrom even in conventional washing baths. In the embodiment, clean water is supplied to the washing bath 74c and then supplied to the lower washing bath 74a by being sequentially overflown to thereby maintain the water in the uppermost (final) stage washing bath 74c clean at all times. However, a washing system using a plurality of washing baths is not limited to the multi-stage countercurrent system and a system in which the washing water in the respective washing baths is not flown out to other baths and a system in which washing water is flown to a washing bath located downstream of a transport direction may be also employed.

Further, when a washing effect is enhanced by flowing washing water in a direction same as or opposite to the transport direction of the light-sensitive material in the washing baths, this arrangement can be more easily realized by the embodiment than conventional vertical washing baths because it is sufficient only to make a water flow in a horizontal direction.

As shown in FIG. 1, the plurality of stacked processing baths 82 are disposed in a staggered fashion so that the ends thereof in the transport direction alternately project. With this disposition, the light-sensitive material A drawn out upward from a lower processing bath is directly inserted into the next processing bath with its transport direction changed by the guide roller 92d so that it can be inserted thereinto in a minimum distance of movement.

Figure 3:
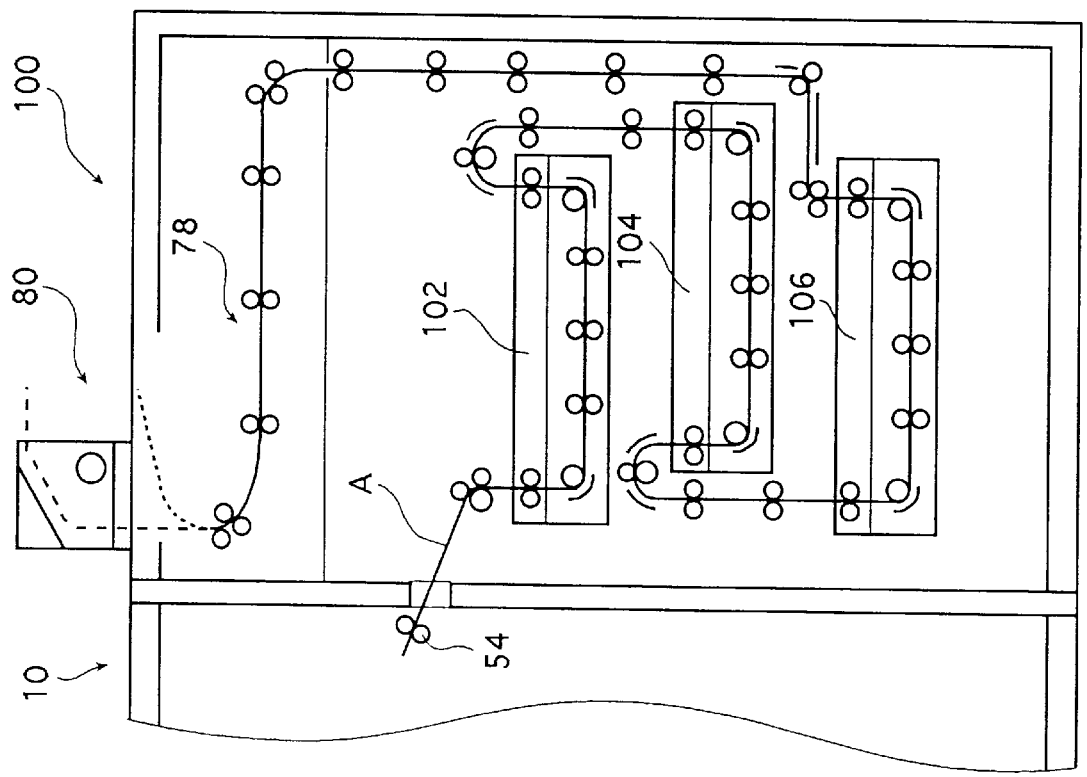
FIG. 3 is a schematic view of another embodiment of the light-sensitive material processing apparatus of the present invention.

Incidentally, the light-sensitive material processing apparatus 20 shown in FIG. 1 is arranged such that the light-sensitive material A is processed while being sent upward through the development bath 70, the fixing bath 72 and the washing baths 74a, 74b, 74c which are stacked on top of each other in this order in a multi-stage from a lower side to an upper side. However, the present invention is not limited to this arrangement and a development bath 102, fixing bath 104 and washing bath 106 may be stacked on top of each other from an upper side to a lower side in a multi-stage as shown in a light-sensitive material processing apparatus 100 of FIG. 3. The arrangement of the processing baths such as the development bath 102, fixing bath 104, washing bath 106 and the like of the light-sensitive material processing apparatus 100 shown in FIG. 3 is similar to the arrangement of the processing baths 82 such as the development bath 70, fixing bath 72, washing baths 74a, 74b, 74c and the like of the light-sensitive material processing apparatus 20 shown in FIG. 1 and FIG. 2 except only that the light-sensitive material A in the processing apparatus 100 is inserted into the processing baths from the top thereof (lid member), whereas it is inserted into the processing baths from the side thereof (side wall surface of the processing bath main bodies 86 of the processing baths 82) in the processing apparatus 20 and accordingly the guide rollers used in the light-sensitive material processing apparatus 100 are different from those used in the light-sensitive material processing apparatus 20. Therefore, the description of the arrangement of the processing baths themselves of the light-sensitive material processing apparatus 100 is omitted.

Incidentally, the embodiment shown in FIG. 1 is an embodiment of the photoprinter carrying out digital exposure, the present invention is also applicable to a photoprinter carrying out analog exposure (surface exposure) as described above.

Figure 4:
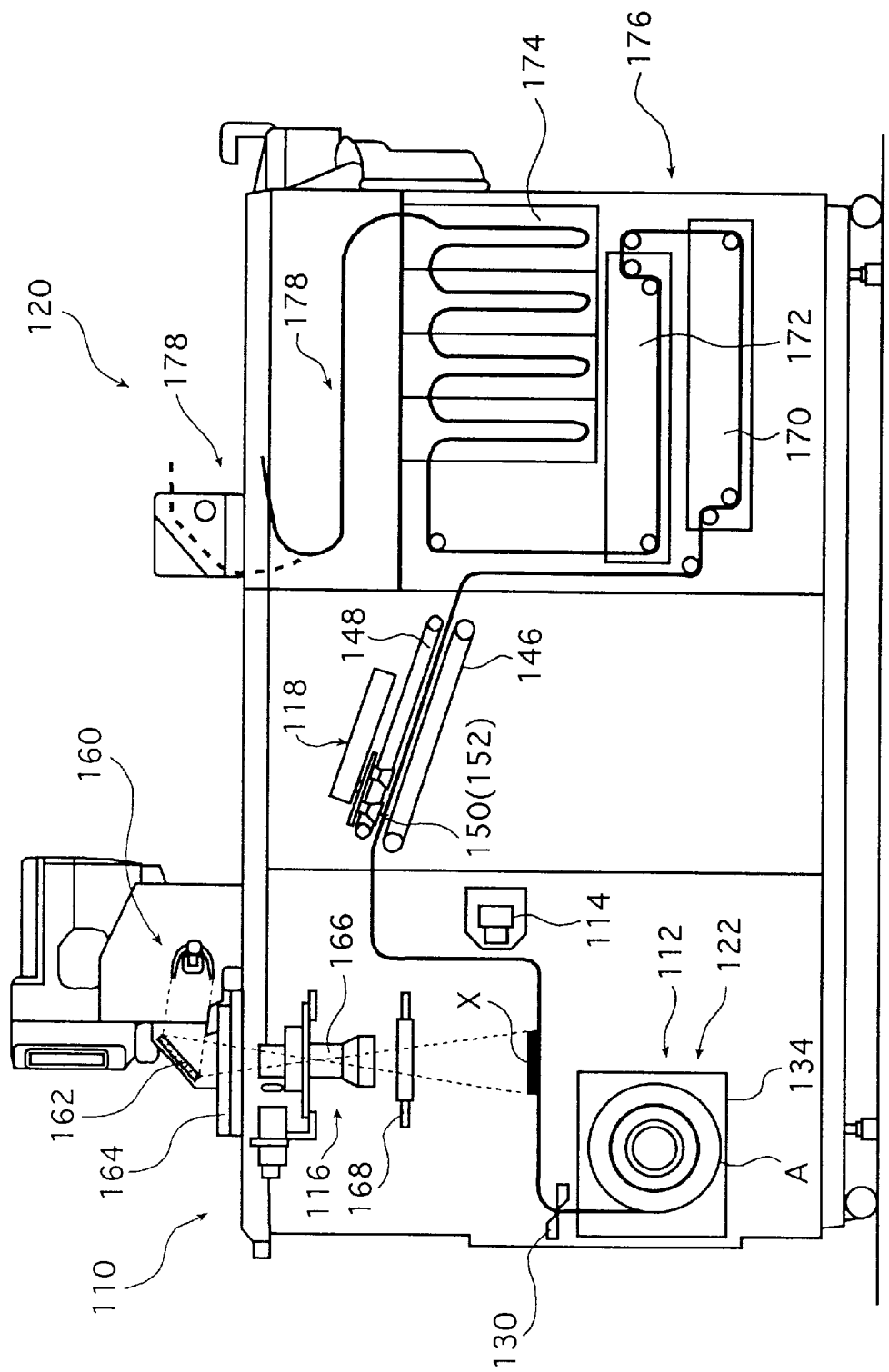
FIG. 4 is a schematic view of another embodiment in which the light-sensitive material processing apparatus of the present invention is applied to an analog photoprinter.

FIG. 4 shows the essential arrangement of an embodiment of the photoprinter carrying out analog exposure to which the present invention is applied.

An image recording apparatus 110 shown in FIG. 4 is an apparatus for cutting the web of light-sensitive material to cut sheets having a preset length corresponding to a finished print and thereafter carrying out back print (print information on a backside) and surface exposure and supplying exposed light-sensitive materials A to a light-sensitive material processing apparatus 120 (processor) and includes a light-sensitive material supply unit 112, a back print unit 114, an image recording unit (image exposing device) 116 and a distribution unit 118.

The light-sensitive material supply unit 112 has a loading section 122 disposed thereto and a magazine 134 composed of a shading cabinet in which an elongate rolled light-sensitive material A is accommodated is loaded on the loading section 122. Thus, the light-sensitive material supply unit 112 is essentially arranged similarly to the light-sensitive material supply unit 12 of the digital image recording apparatus 10. Further, a cutter 130 is disposed downstream of the loading section 122 in the vicinity thereof.

The image recording unit 116 includes a light source 160, reflection mirror 162, negative film carrier 164, lens 166, shutter 168 and the like. Light emitted from the light source 160 is bent by the reflection mirror 162 approximately 90( and passes through a film set to the negative film carrier 164. Subsequently, the light projected from the film is incident on the light-sensitive material A set at a preset exposing position X through the lens 166 for a preset time through the shutter 168 which is opened for the preset time in correspondence to the exposure density of the film. With this operation, a so-called surface exposure is carried out.

Further, color may be corrected by a color filter and an amount of exposure may be adjusted by an ND filter.

The back print unit 114 for making back print on the back surface of the light-sensitive material A is essentially arranged similarly to the back print unit 14 of the digital image recording apparatus 10.

The distribution unit 118 distributes the light-sensitive materials A to a plurality of to rows in a lateral direction to thereby enhance the developing capability of the light-sensitive material processing apparatus 120 so that a difference between processing times between a development process and an exposure process is compensated. The distribution unit 118 is composed of a belt conveyer 146, auxiliary belt conveyer 148 and sucking units 150, 152 and essentially arranged similarly to the distribution unit 18 of the digital image recording apparatus 10.

Further, the light-sensitive material processing apparatus 120 subjects the light-sensitive material A on which a latent image is formed to various types of processing such as color development processing, bleach-fix processing, dry processing and the like and is composed essentially of a development section 176 including a development bath 170, a fixing bath 172 and four washing baths 174, a drying section 178 and a sorter section 180.

The image recording apparatus 110 essentially exposes the light-sensitive material A as described below.

First, the light-sensitive material A is drawn out and made to cut sheets by being cut to a preset length by the cutter 130. Next, the sheet-shaped light-sensitive materials A are sequentially transported to the image recording unit 116 and set at the preset exposing position X. At the time, the shutter 168 is closed.

On the other hand, when a film is set to a preset position by the negative film carrier 164 in the image recording unit 116, light is irradiated from the light source 160 onto the film and the light projected therefrom is irradiated onto the light-sensitive materials A through the lens 166 for a time during which the shutter 168 is opened in correspondence to the exposure density of the film so that exposure is carried out to the light-sensitive materials A as shown in FIG. 4.

The light-sensitive materials A to which exposure has been carried out and on which a latent image has been formed are fed to the back print unit 114 and various information is back printed thereon and then the light-sensitive materials A are horizontally transported to the distribution unit 118. In the distribution unit 118, the light-sensitive materials A are distributed in a direction normal to a transport direction (lateral direction) by the sucking units 150 and 152 and disposed in a plurality of rows such as two rows or three rows and thereafter transported to the light-sensitive material processing apparatus 120.

The light-sensitive materials A fed to the light-sensitive material processing apparatus 120 as described above are subjected to the various types of processing such as the color development processing, bleach-fix processing, dry processing and the like in the development section 176, dried in the drying section 178 and discharged to the sorter section 180 as finished prints.

In the development section 176 of the embodiment, the development bath 170 and fixing bath 172 are formed to the pan-shaped shallow horizontal baths of the present invention and the four washing baths 174 are formed to a processing bath similar to that of prior art which is deep in a vertical direction.

Since the arrangement of the development bath 170 and fixing bath 172 is similar to that of the processing bath 82 as shown in FIG. 1, the detailed description thereof is omitted.

Washing water such as tap water or washing water added with additives such as a stabilizing agent, an antiseptic, etc. is held in the washing baths 174. It is preferable that the four washing baths 174 are arranged to carry out washing by a countercurrent system. That is, in the four washing baths 174, washing water or a washing solution overflown from the lowermost washing bath 174 sequentially flows toward the washing baths located upstream. As a result, what is handled in the maintenance of the washing baths 174 is the washing water or the washing solution which can be handled even by an ordinary user other than an expert service man. As apparent from a conventional light-sensitive material processing apparatus 200 shown in FIG. 5, it should be noted that even if washing baths 210a–210d are long in a vertical direction, their depth is shallower than that of a development bath 206 and fixing bath 208 which are long in a vertical direction likewise; accordingly, even if maintenance is carried out by drawing out transport mechanism racks 222 upward, a time and effort needed by the maintenance are less than those required when maintenance is executed by drawing out the transport mechanism racks 218 and 220 of the development bath 206 and fixing bath 208.

On the other hand, since an alkali development processing solution and acid fix processing solution are held in the development bath 170 and the fixing bath 172, respectively, it is not preferable for an ordinary user to be in direct contact these solutions. In addition, since the conventional light-sensitive material processing apparatus ordinarily employs processing baths deeper than washing baths, it takes a great deal of time and effort to execute maintenance by drawing out the transport mechanism racks in the processing baths.

To cope with this problem, the embodiment arranges only the development bath 170 and fixing bath 172 as the pan-shaped shallow horizontal processing bath.

In addition, it is not preferable as described above that the development processing solution and fix processing solution are in direct contact with clothes and skin because they are alkali and acid solutions. Thus, it is effective to use the processing bath 82 sealed with the lid member 88 as the development bath 170 and fixing bath 172 also in this respect.

The light-sensitive material processing apparatus applied to the photoprinter, which chiefly uses a sheet-shaped light-sensitive material (photographic paper), subjects an image carried on a photographic film to digital exposure or analog exposure (surface exposure) and thereafter develops the light-sensitive material and finishes it to a finished print, has been described as the light-sensitive material processing apparatus of the present invention. However, the present invention is not limited thereto and may be a light-sensitive material processing apparatus using a web of a rolled light-sensitive material (photographic paper) or a light-sensitive material processing apparatus for a photographic film. Since the light-sensitive material processing apparatus using the rolled light-sensitive material (photographic paper) and a photoprinter using this light-sensitive material processing apparatus are the same as the aforesaid embodiments except that a light-sensitive material transport mechanism can be simplified, the description thereof is omitted. In addition, since the arrangement of the light-sensitive material processing apparatus for the photographic film is almost the same as that of the above embodiment except that it employs a known film taking-out device for taking out a film from Patrone in place of the above image recording device of the photoprinter, the description thereof is omitted.

While the light-sensitive material processing apparatus of the present invention has been described above in detail with reference to the various embodiments, the present invention is by no means limited to the above embodiments and it goes without saying that various improvements and modifications can be made within a scope which does not depart from the gist of the invention.

As described above in detail, according to the present invention, since at least one of the plurality of processing baths such as the development bath, fixing bath, washing baths and the like, preferably, at least the development bath and fixing bath can be easily drawn out in a horizontal direction (in particular, preferably toward the operator's side) or taken out, the light-sensitive material transport mechanism racks in the processing baths can be easily taken out. As a result, maintenance such as the cleaning, repair and replacement of the processing baths or the transport mechanism racks in the processing baths and the solution of troubles such as jamming and the like of a light-sensitive material, which has heretofore required much expense in time and effort, can be easily carried out, whereby prints of high quality can be finished at all times without the occurrence of a defectively colored print and a discolored print.

According to the present invention, since the maintenance such as the cleaning, repair and replacement of the processing baths can be easily carried out, a time during which a photoprinter is interrupted due to the removal of the processing baths can be also shortened.

Figure 5:
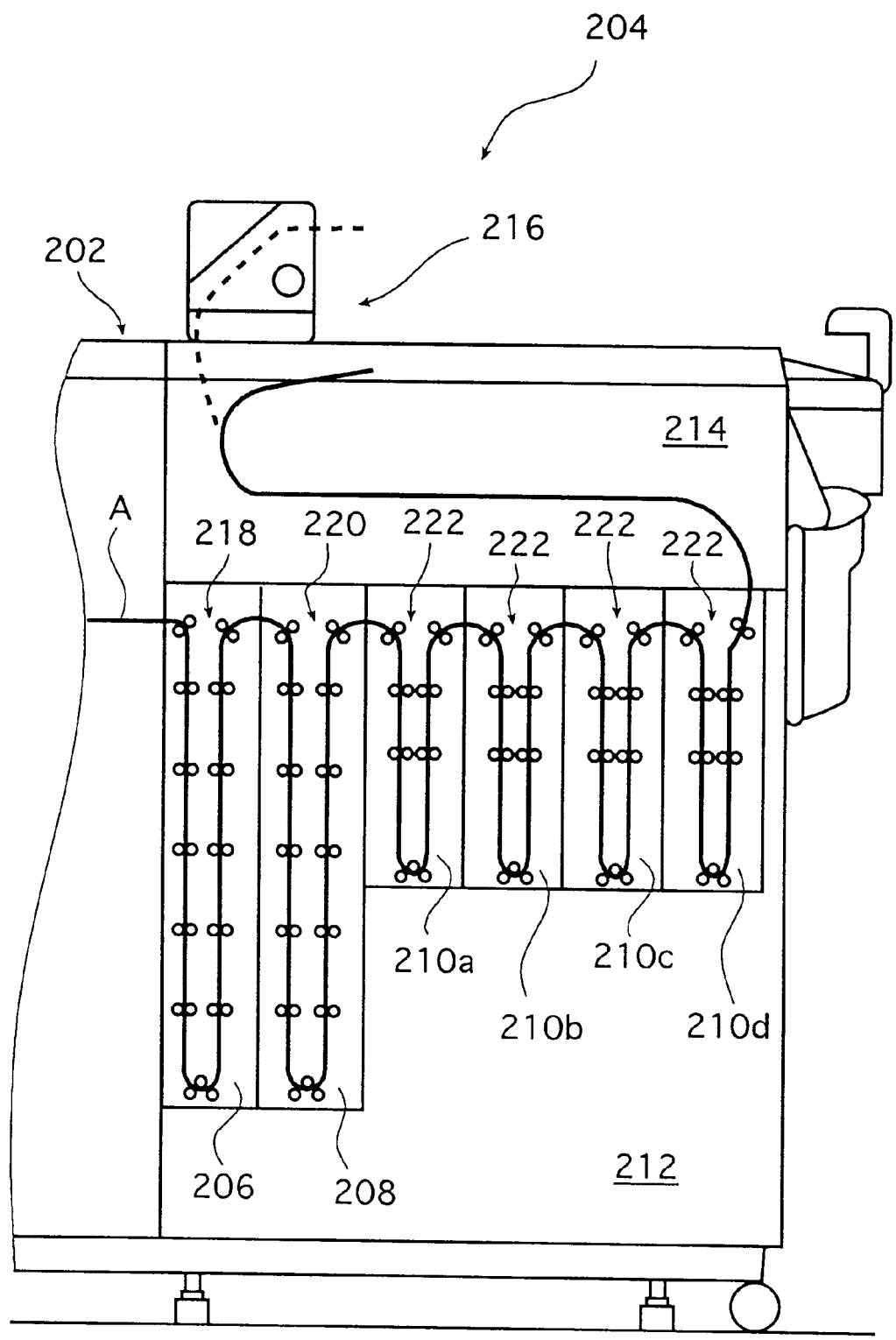
FIG. 5 a schematic view of a conventional light-sensitive material processing apparatus.

When the processing baths are drawn out to the operator's side, working space for operating the light-sensitive material processing apparatus or the photoprinter to which the apparatus is applied is set on the operator's side and no obstacle is located there. Accordingly, the dry section, the sorter section and the like, which are located above the processing baths in the prior art, for example, as shown in FIG. 5 and become obstacles when the processing baths are drawn out upward, need not be removed, whereby the processing baths can be easily drawn out.

According to the present invention, when the processing baths are taken out, the overflow of processing solution contained therein can be prevented by the provision of the lid member. Therefore, the processing baths can be handled at ease and there is not a possibility that the processing solutions contact cloths and a body, which permits the processing baths to be handled at more ease.

According to the present invention, since the processing baths can be formed to the pan-shaped horizontal processing baths, the light-sensitive material processing apparatus can be arranged by stacking them to a multi-stage. Therefore, a space occupied by the apparatus can be reduced as compared with a case that the conventional vertical processing baths are disposed horizontally.

Further, when the plurality of processing baths such as the development bath, fixing bath and washing baths are arranged as the cartridges in the present invention, they can be easily replaced together with the processing solutions contained therein. Therefore, maintenance such as the cleaning, repair, replacement and the like of the respective processing baths and the transport mechanism racks and the like in the processing baths becomes unnecessary and even an ordinary user can replace the processing bath containing a deteriorated processing solution without the need of calling an expert service man. As a result, prints of high quality can be finished at all times by preventing the occurrence of prints of bad quality such as a defectively colored print and a discolored print without continuously processing a light-sensitive material with a deteriorated processing solution.

What is claimed is:

1. A light-sensitive material processing apparatus comprising:

a development section having a plurality of processing baths including a development bath for subjecting exposed light-sensitive materials to color development processing, a fixing bath for subjecting the color developed light-sensitive materials to bleach-fix processing and washing baths for washing the bleached and fixed light-sensitive materials;

a drying section for drying the developed, fixed and washed light-sensitive material; and a sorter section for arranging and accumulating the dried light-sensitive materials;

wherein at least one of the processing baths including the development bath, the fixing bath and the washing baths which constitute the development section is a pan-shaped horizontal processing bath with its upper surface opened that is disposed at a horizontal position, transports the light-sensitive materials in the processing solutions in the processing baths in a horizontal direction and can be drawn out in a horizontal direction which is parallel with or normal to the transport direction of the light-sensitive materials.

2. The light-sensitive material processing apparatus according to claim 1, wherein said horizontal processing bath includes a transport mechanism for transporting the light-sensitive materials in the horizontal direction and the transport mechanism can be drawn out together with said horizontal processing bath and taken out upward from the upper side of said horizontal processing bath opened therefrom.

3. The light-sensitive material processing apparatus according to claim 1, wherein a plurality of said horizontal processing baths are disposed in a staggered arrangement by being stacked on top of each other so that the ends thereof alternately project in a light-sensitive material transport direction.

4. The light-sensitive material processing apparatus according to claim 1, wherein said horizontal processing bath has a lid member removably disposed on the open upper surface thereof to prevent the leakage of the processing solution.

5. The light-sensitive material processing apparatus according to claim 1, wherein at least one of the development bath and the fixing bath of said horizontal processing baths is a horizontal processing bath cartridge including a transport mechanism for horizontally transporting the light-sensitive material and a processing solution each contained in said horizontal processing bath, a lid member disposed on the upper surface of said horizontal processing bath for sealing said horizontal processing bath in a liquid tight state except a light-sensitive material inlet port and a light-sensitive material outlet port which are disposed in the vicinities of both the sides of said horizontal processing bath in the light-sensitive material transport direction and liquid tight opening/closing lids which are opened only when they are loaded at preset positions of the light-sensitive material processing apparatus or the light-sensitive material is transported in or transported out.

* * * * *